Feb. 28, 1928.
P. R. HEYL ET AL
1,660,751
INDUCTOR COMPASS
Filed Jan. 11. 1922
6 Sheets-Sheet 2
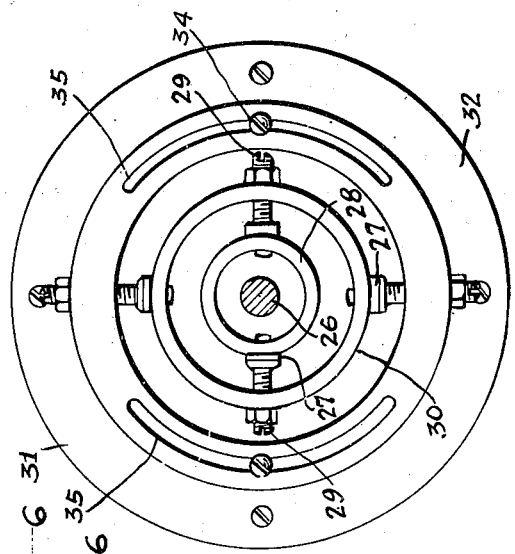
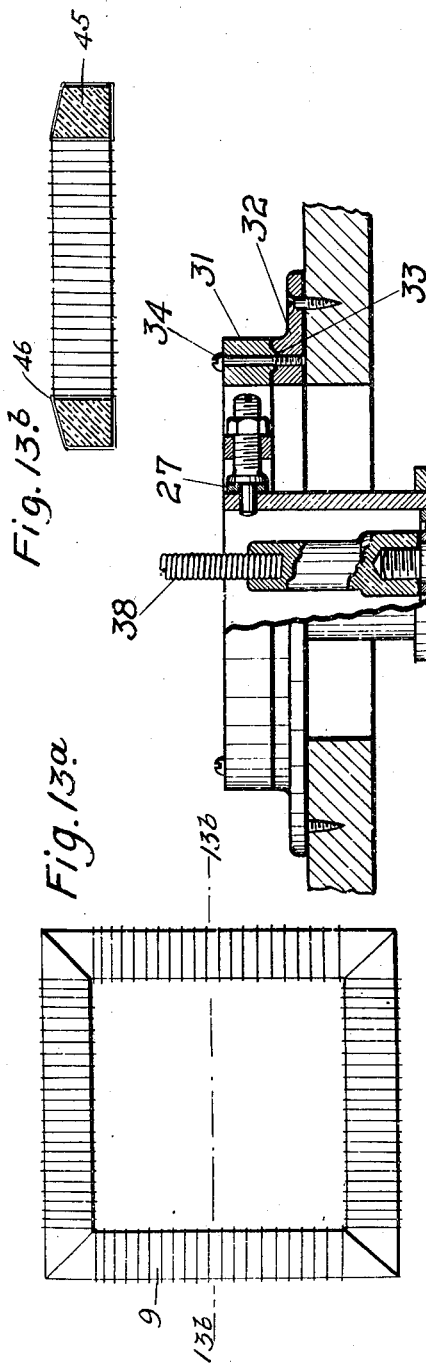
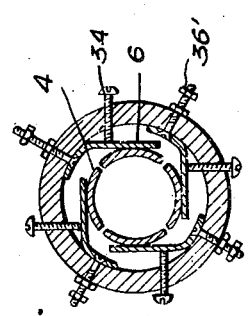
Inventors,
P. R. Heyl
L. J. Briggs
By Robert H. Young
Attorney

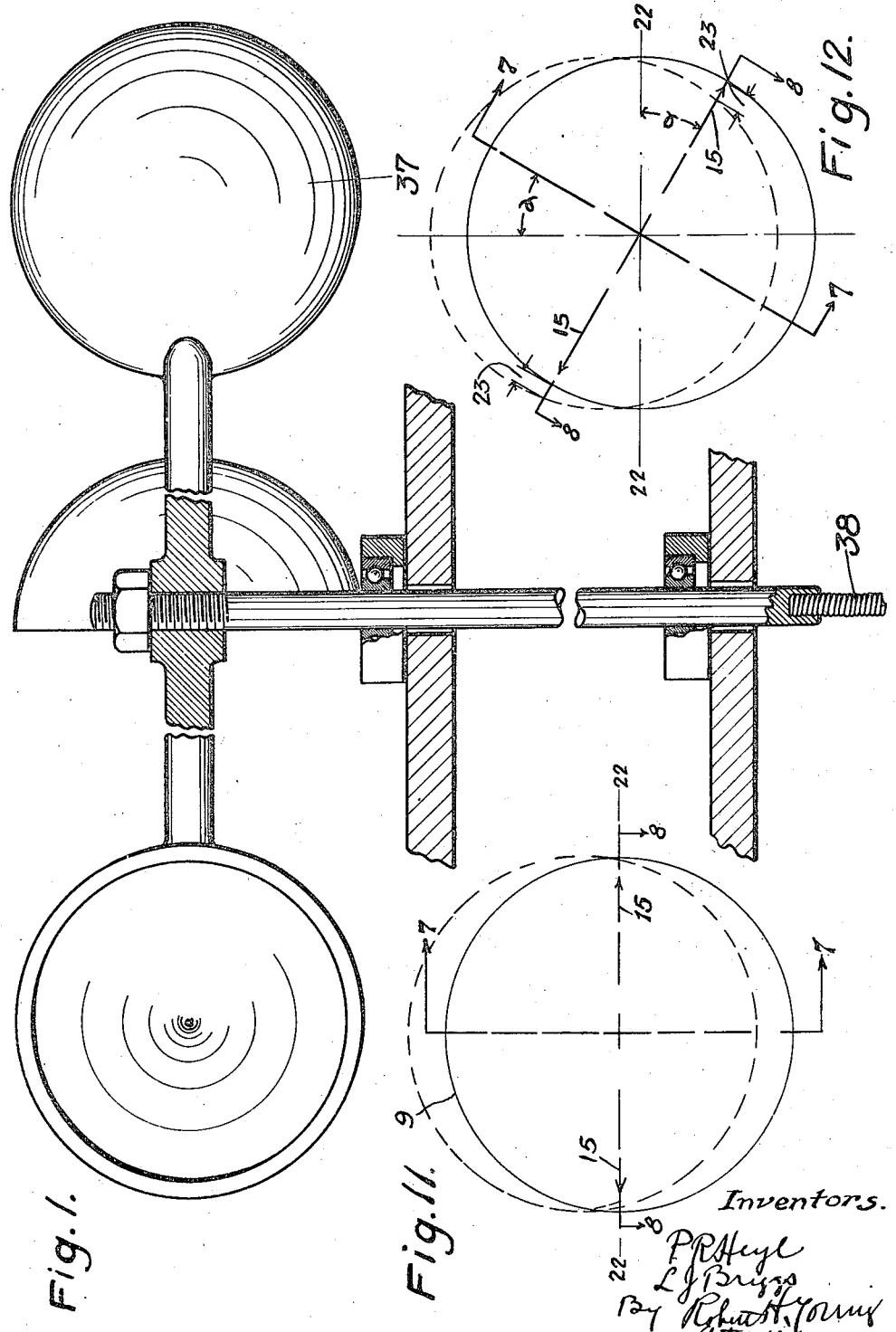

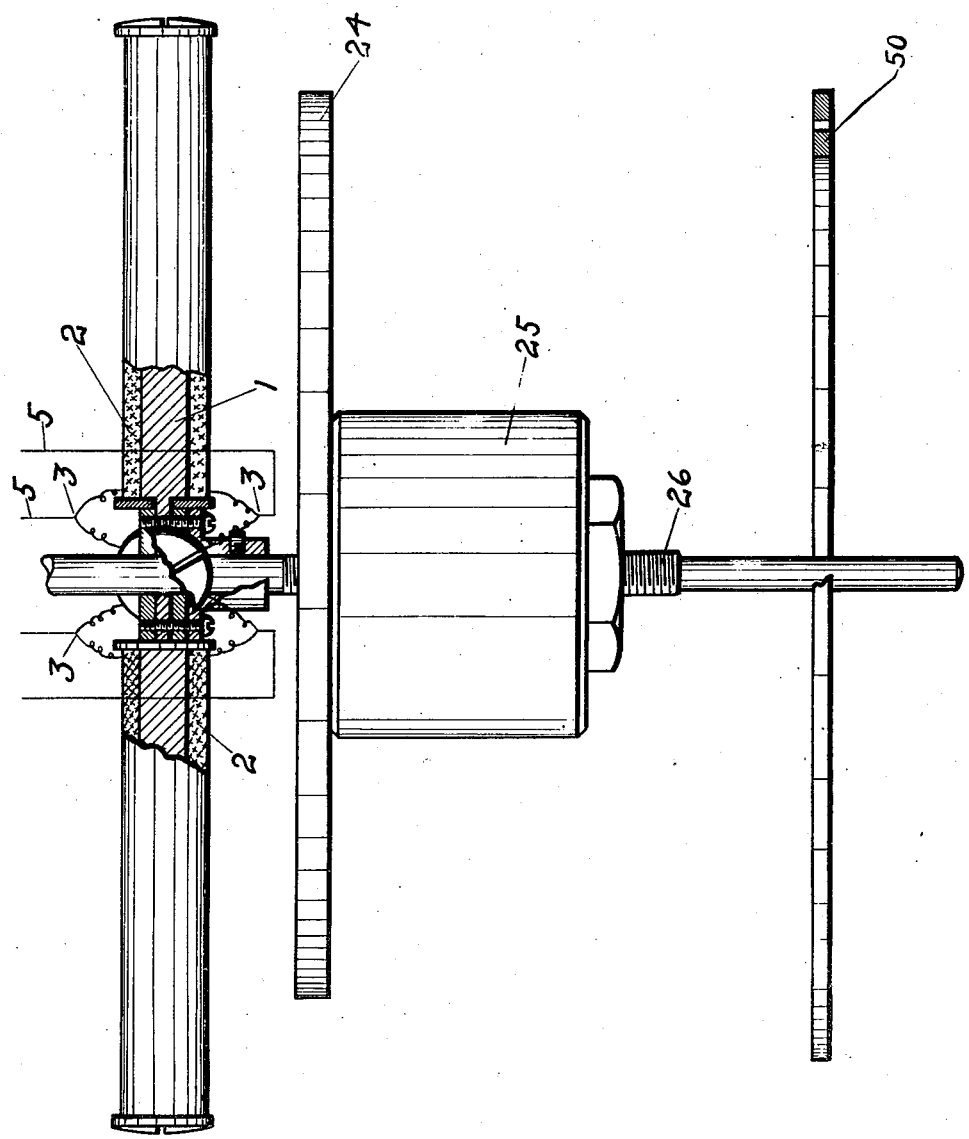

Patented Feb. 28, 1928.

1,660,751

UNITED STATES PATENT OFFICE.

PAUL R. HEYL AND LYMAN J. BRIGGS, OF WASHINGTON, DISTRICT OF COLUMBIA, ASSIGNORS TO AERONAUTICAL INSTRUMENT COMPANY, OF PITTSBURGH, PENNSYLVANIA.

INDUCTOR COMPASS.

Application filed January 11, 1922. Serial No. 528,580.

The present invention relates to compasses such as are employed upon aircraft or the like and more particularly to such as are dependent upon an electromotive force being set up by virtue of a coil member rotating in the earth's magnetic field.

Heretofore in most devices two important difficulties have been encountered. In the one case due to the very uneven course in three dimensions taken by aircraft, besides pitching and rolling effects, the compass readings can become so masked as to render the compass practically useless. On the other hand, the bulkiness of earth inductor devices having an air core so great as to offer the additional difficulty of allocating proper space to the inductor generator as well as to its appurtenances.

A feature of this invention relates to an improvement in earth inductors wherein an iron core is employed and in which the coils themselves can act gyrostatically in maintaining stability and eliminating the rolling and pitching errors. In so far as a gimbal suspension is made use of it is easily seen that the invention practically eliminates all the masking effect produced by virtue of the vertical component of the earth's magnetic field. It should also be stated that having eliminated such disturbances the present invention lends itself admirably to automatic navigation of air craft for example.

A feature of the invention is in so adjustably coordinating the gyroscopic masses with relation to the usual time periods of oscillation of the craft as a whole that by means of added frictional energy absorbing devices or the like the compass takes up its normal position within a relatively short time.

In so far as the alternating currents set up are variously rectified by the orientation of the craft during operation, the invention also includes a very effective means of working the initial adjustments of the rectifying means with respect to the craft's axial alignment.

For a better elucidation of these and other features of the invention the annexed drawings are included in which:

Fig. 1 comprises a part sectional view of one type of motor device to be used with the apparatus.

Fig. 2 comprises a part sectional view of that part of the apparatus which includes the commutator or current rectifying means.

Fig. 3 comprises a part sectional view of the generator proper with its adjustable gyroscopic controls.

Fig. 4 represents schematically and functionally a general view of the different elements of the device together with a wiring diagram of the same.

Fig. 5 corresponds to a detail plan view of the gimbal support of the generator.

Fig. 6 corresponds to a part sectional view of the cummutator illustrated in Fig. 2.

Fig. 10$^a$ a front face view of the switchboard of Figs. 9 and 10.

Fig. 11 represents diagrammatically the distribution of potential of the winding 9 with respect to a plane polar system of coordinates.

Fig. 12 corresponds to Fig. 11 with the axis of potential shift displaced with reference to the showing in the former figure.

Fig. 13$^a$ is a plan view of a resistor, and Fig. 13$^b$ a sectional view taken on the line 13$^b$—13$^b$, Fig. 13$^a$.

Figure 7:
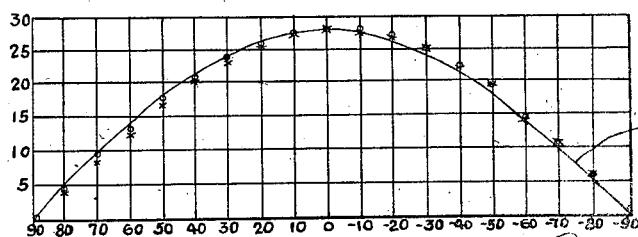
Fig. 7 illustrates the type of voltage distribution set up by the generator shown in Figs. 3 and 4, as the brushes (axis of the craft) are displaced from the magnetic meridian.

In connection with the earth inductor coils of the well known type (and, therefore, not illustrated herewith) it is well known that the voltage distribution as a function of the angular displacement is sinoidal in character. On the other hand, as appears from an experimental determination, see Fig. 7, the angular rotation of an iron core 1 (Figs. 3 and 4) wound with insulated wire 2 also sets up the same type of voltage distribution. It is this fact that is made use of for the arrangement of the generator assembly indicated in Figs. 3 and 4.

In general, four armatures or cores 1 are wound with a predetermined number of turns constituting the windings 2. The above windings 2 are in a preferred embodiment connected together in series to form a closed circuit, the points 3 intermediate between the coils being connected respectively to the corresponding commutator segments 4 by means of leads 5.

Figure 4:
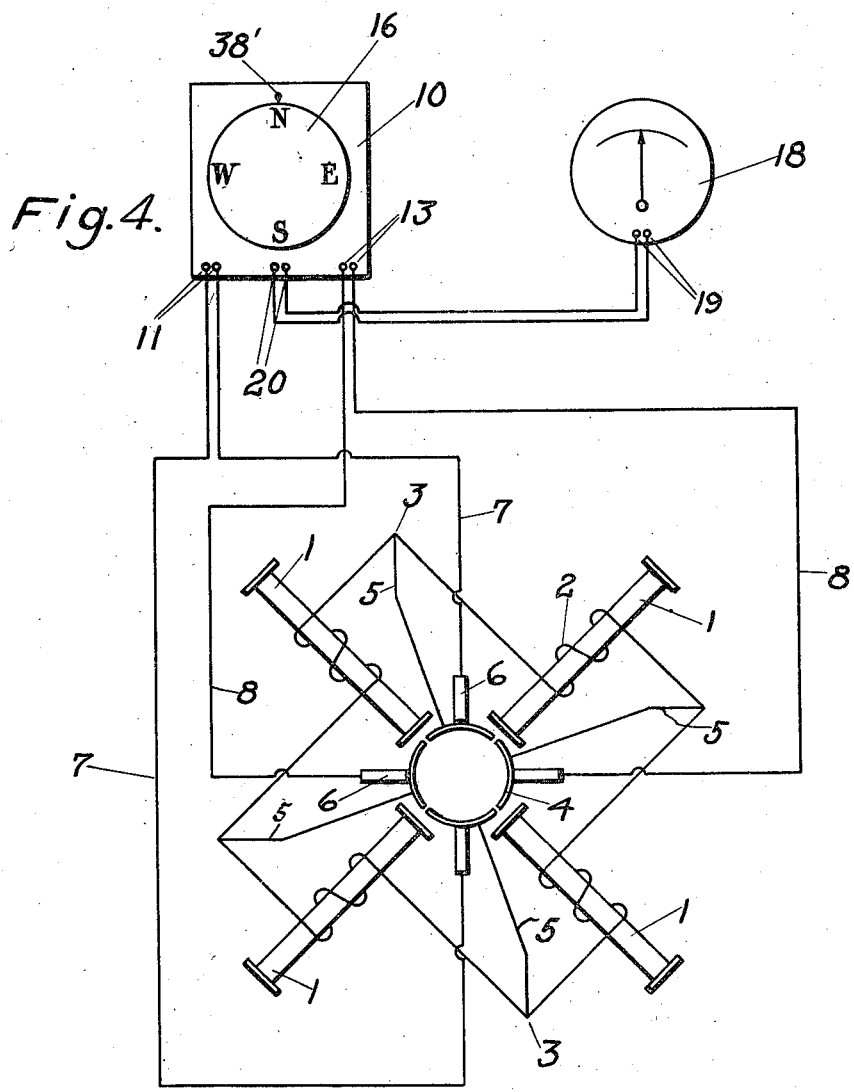
Figure 8:
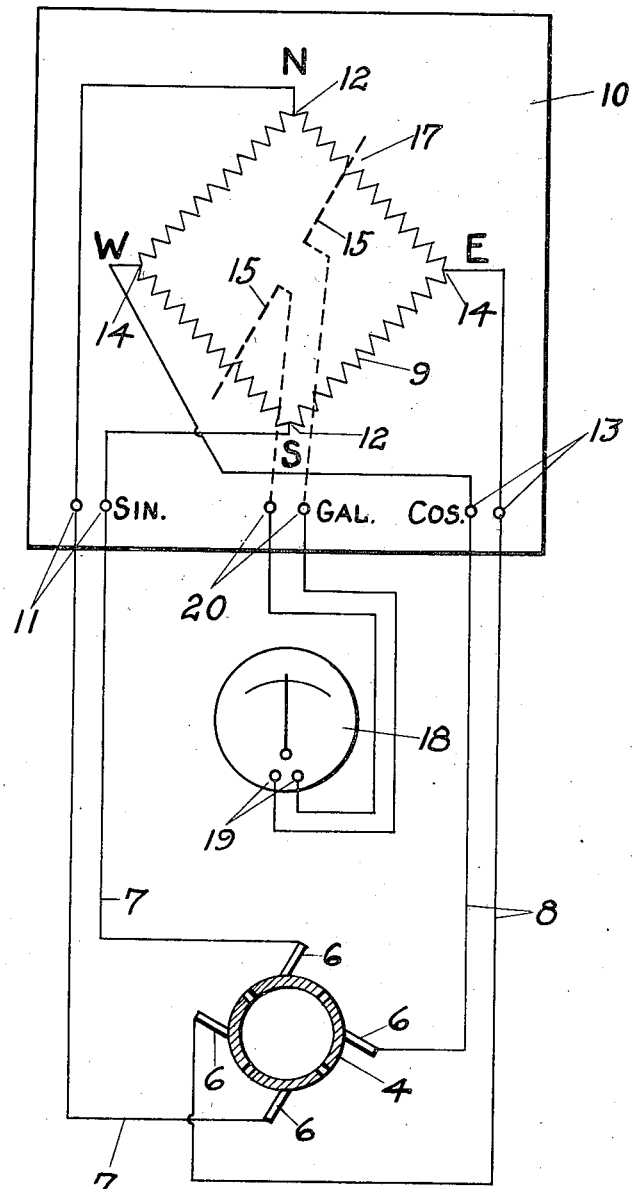
Fig. 8 is a view similar to that of Fig. 4.

Having reference to Figs. 4 and 8, contacting with the commutator at opposite points are a plurality of brushes 6, four in number in the present instance, with leads 7, 7 and 8, 8 connecting with corresponding opposite points of a closed winding 9 of a dial switchboard 10. The leads 7, 7 are connected to terminals 11, 11 respectively, and these again are in turn connected to opposite points 12, 12 of winding 9 of the dial switchboard. Similarly the leads 8, 8 are connected to the terminals 13, 13 which in turn are permanently connected to opposite points, 14, 14, which latter form in conjunction with the points 12, 12 a quadrantal division of the closed winding 9, which is a resistance coil formed of insulated wire.

Preferably according to this invention the closed potential winding or resistor 9 (see Fig. 9) is wound in the form of a square with a single size wire with the spires evenly spaced. This type of construction while convenient is not absolutely necessary. It should be pointed out that contactors 15, 15 mounted upon a revoluble course setting disc 16 (see preferably Figs. 8 and 10) form electrical contact with opposite points of the potential winding by having the insulation of the latter winding abraded at 46 within a closed path 17 of the contactors 15. It is in this manner that a galvanometer 18 can have its terminals 19, 19 in continuous electrical contact with the revoluble contactors 15 by virtue of terminals 20 placed upon the dial switchboard. The details of the mounting of the contactors 15 with respect to the winding 9 (see Figs. 9, 10, 10ª) will be later gone into further.

The effect of the brush assembly 6 when mounted fixedly as regards orientation upon the aircraft structure, with respect to the rotating armatures 1, armature windings 2, and commutator segments 4, results in the setting up of a potential distribution on the resistance winding 9 which becomes directively fixed in the manner now to be explained.

Let it be assumed by way of example that with a given orientation of the craft, and with the dial switchboard arranged in a horizontal plane, the voltage distribution set up in the winding 9 (see Fig. 11) corresponds to the radial height of the curve 21.

The contactors 15, 15, which act as potential collectors, if placed in the position indicated in the latter figure will be so placed as to give a null reading on the galvanometer.

If now the craft which carries the earth inductor and switchboard becomes oriented differently the voltage distribution remains fixed in space nevertheless. With the angular orientation α of the craft (see Fig. 12) from the standard position above indicated in Fig. 11, the potential collectors 15, 15 being fixedly attached to the craft will suffer an equal orientation α to correspond and will therefore not collect at the null points along the axis 22 but rather along an axis coincident with the new absolute position of the potential collectors 15, 15, indicated in Fig. 12.

The angular displacement of the brushes being of amount α with respect to the fixed null axis 22—22, a current will flow in the galvanometer circuit corresponding to the radial ordinate 23. Thus only when the collectors 15, 15 are swung back to the original fixed direction in space will the galvanometer needle indicate zero position. It is from this circumstance that the orientation of the craft can always be determined. Of course, is should be understood that it is by no means necessary for the plane of the resistor to coincide in direction with that of the generator brushes as a whole. The one-to-one directional correspondence will still remain true if the dial switchboard is placed in any convenient position.

A feature of our invention has to do with means whereby any oscillations of the generator axis set up by sudden aircraft movements or the like are quickly damped out. In the first place, it should be noted that by making the armature assembly act as a gyrostatic pendulum the amplitude is decreased and the damping is considerably increased. The difference of action becomes very marked if the generator motor is cut off so as to make of the armature a pendulum of the simple type. The weighting of the armature assembly therefore is so adjustably arranged by means of the gyro disc 24 (Fig. 3) and gravitational bob 25 mounted upon the threaded drive spindle 26 that the time of oscillation will be shorter, preferably, than that corresponding to natural oscillations of the aircraft in normal operation. In so far as it becomes necessary to damp the oscillations unavoidably set up, frictional washers or the like 27 (Fig. 2) are introduced into the gimbal suspension. The gimbal suspension comprises an inner ring 28 (Fig. 5) supported on adjustable studs 29 which latter are mounted in an outer ring 30. On the other hand, the latter ring is again mounted upon an adjustably ring support 31 (see Figs. 2 and 5) which can be rotated in a base ring 32 by virtue of a groove 33. The support 31 is adjustably fixed to the base ring 32 by means of a bolt 34 passing through a properly arranged slot 35 on the support 31 and best illustrated in Fig. 5. A guard ring 50 is also provided to limit the possible gyrations of the armature spindle should the aircraft resort to extraordinary tactical movements.

With respect to the commutator device which we have shown in Fig. 6, namely a system of brush collectors 6 of the leaf spring type to be controlled by a system of screws 36, 36', it should be specially understood that the invention is not limited to the precise form of commutator assembly illustrated herewith. As a matter of fact, it has been found that carbon brushes of the ordinary high potential type can be very successfully employed if desired.

The invention as disclosed is illustrated in connection with air cup drive 37 (see Fig. 1). However, this is by no means necessary for an electrical drive can be substituted if need be. A flexible shafting 38 can be employed in both instances.

Figure 9:
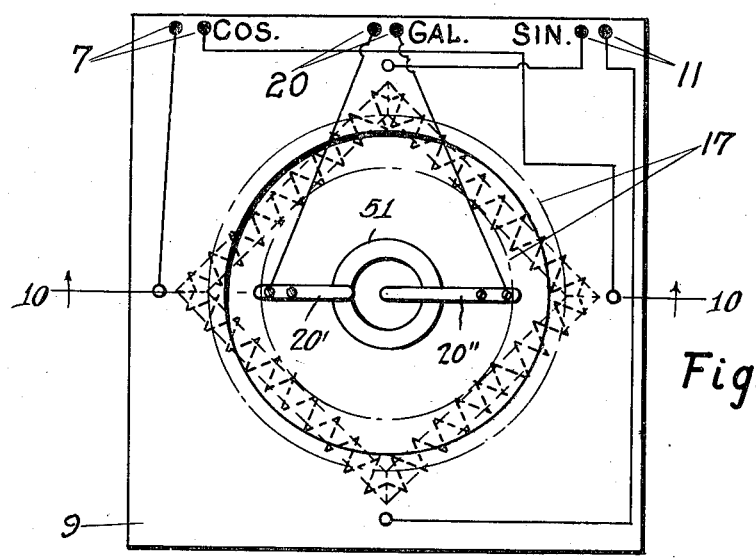
Fig. 9 is a rear face view of a dial switchboard.
Figure 10:
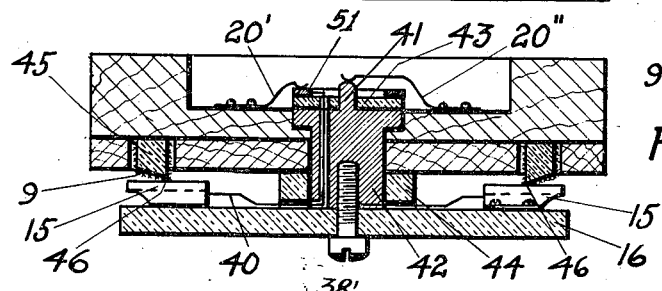
Fig. 10 a sectional view taken on the line 10—10, Fig. 9.
Figure 10A:
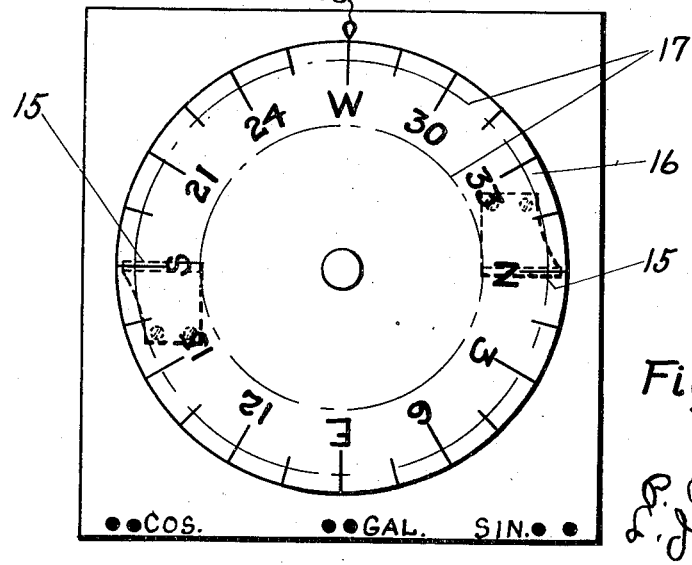

Turning to the preferred embodiment of the dial switchboard of Figs. 9, 10, 10ᵃ, means are illustrated for providing an elastic connection, as it were, between the galvanometer terminals 20 and the contactors 15 for the potential resistor 9. Thus the one terminal 20 is connected to a spring clip 20' (see Fig. 10) which latter clip engages with the contact ring 51 connected by an insulated wire 40 to one of the potential contactors 15. The other corresponding terminal 20 is connected to a second spring clip 20'' which engages with a central boss or pin 41 of a central stud 42 mounted upon the course-setting disc 16. The stud 42 is also connected to the opposite potential contactor 15, which latter in turn connects to its corresponding galvanometer terminal 20. In so far as insulation 43 and 44 is provided, the two potential contactors are not short circuited. The current flow through each, therefore, takes place by means of the portions made in the winding 9 from which the insulation is abraded. Figs. 13ᵃ and 13ᵇ indicate the manner of providing such abraded resistor.

The resistor 9 is preferably made up in square form with the four limbs of irregular cross-section as indicated at 45 in Fig. 13ᵇ. The top edge 46 of the coils of the resistor having its insulation abraded, there is no difficulty in getting contact with the edges of the contactors 15, 15, as the latter describe their circular path 17 indicated by broken lines.

Referring now to the bob and disc controls for the rotating armatures 1, it should be stated that the main gravitational effect tending to keep the shaft of the armatures perpendicular is produced primarily by means of the bob 25 having a low value for its radius of gyration. On the other hand, the control for the period of swing or oscillation may be left to the proper positioning of a disc 24 (Fig. 3) which is made to have a relatively high value for its radius of gyration. In this manner the gyroscopic actions of the pendulum as a whole are effectively modified to suit the conditions appertaining to a very heavily loaded aircraft fuselage, or the same fuselage when very lightly loaded.

With the aircraft properly oriented in any desired manner the drive 37 is actuated so that by means of the flexible connection 38 the armatures 1 are rotated in the earth's magnetic field. In the embodiment disclosed only four armatures are employed though the number may be greater or less than the above amount. Strangely enough, the distribution of electromotive force set up in the windings does not appear to be affected by the fact that the cores are of iron. Being iron they have high permeability and low residual magnetism. Hysteresis and eddy currents, it has been discovered, play but a very secondary rôle, if any at all. This is clear from an inspection of Fig. 7, which shows the usual type of experimental (and systematic) errors. By means of the commutator and metal or carbon brushes (see Figs. 4 and 6) the voltage distribution in space at the commutator is impressed on the potential winding 9 forming part of the dial switchboard. In reality the potential distribution on the winding 9 is made to accord in situ in accordance with the position of the earth's magnetic field so that the potential null axis will shift, so far as the dial switchboard is concerned, with the absolute shift of the feeding conductors 7 and 8 with relation to the earth's magnetic field brought about by changes in direction of travel of the craft. Thus to attain a nodal or null reading on the galvanometer 18 when the direction of the craft changes, it becomes necessary to shift the contactors 15 through an angle corresponding to the shift of the brushes, or in orther words the shift of the craft relative to the absolute north and south lines. The orientation of the craft is therefore indicated by an index pin or lubber mark 38' relative to whatever fineness of graduation may be provided upon the course-setting disc 16 marked as it is with the cardinal points of the compass. Clearly in conjunction with the galvanometer 18 a relay can be employed for automatically keeping to the course so as to correct for the variations of the craft from a predetermined direction.

We claim:

1. An apparatus for determining direction, comprising an earth inductor revoluble about a vertical axis and having a commutator and brushes, a closed resistance winding, means connecting the same at a plurality of equally circumferentially-spaced points with the correspondingly spaced brushes of the inductor commutator, a centrally pivoted member having contacts cooperating with the winding to take current from diametrically opposite points thereof, means constituting a circuit for such current including a current indicator, said member being adapted to be adjusted about its pivot so as to cause zero current to flow through said instrument and having provision whereby it is adapted, when so adjusted, to indicate direction in azimuth.

2. An apparatus as set forth in claim 1, and a universal mounting above said earth inductor to pendulously mount the same for universal movement.

In testimony whereof we have affixed our signatures.

PAUL R. HEYL.
LYMAN J. BRIGGS.